United States Patent [19]

Cousin et al.

[11] Patent Number: 4,758,046
[45] Date of Patent: Jul. 19, 1988

[54] DOUBLE ARTICULATION MEANS FOR ANGULARLY ADJUSTING A SEAT BACK

[75] Inventors: Maurice Cousin, Flers; Yves Pipon; Georges Droulon, both of St. Georges des Groseillers, all of France

[73] Assignee: A. & M. Cousin et Cie, Flers, France

[21] Appl. No.: 867,604

[22] Filed: May 27, 1986

Related U.S. Application Data

[63] Continuation of Ser. No. 606,992, May 2, 1984, abandoned, which is a continuation-in-part of Ser. No. 278,594, Jun. 29, 1981, abandoned.

[30] Foreign Application Priority Data

Jun. 27, 1980 [FR] France ............... 80 14325

[51] Int. Cl.$^4$ ................. A47C 1/025; B60N 1/02
[52] U.S. Cl. .................... 297/365; 297/367
[58] Field of Search ............. 297/355, 363–371, 297/374; 16/225, 332, 333, 337

[56] References Cited

U.S. PATENT DOCUMENTS

| | | | |
|---|---|---|---|
| 3,727,978 | 4/1973 | Barriere et al. | 297/379 X |
| 3,879,802 | 4/1975 | Weiner | 297/363 X |
| 4,076,309 | 2/1978 | Chekirda et al. | 297/363 |
| 4,087,885 | 5/1978 | Gillentine | 297/367 X |
| 4,103,970 | 8/1978 | Homier | 297/367 X |
| 4,178,037 | 12/1979 | Pickles | 297/365 X |
| 4,223,946 | 9/1980 | Kluting | 297/367 X |
| 4,269,447 | 5/1981 | Dolton | 297/365 |

FOREIGN PATENT DOCUMENTS 2364754 8/1974 Fed. Rep. of Germany ...... 297/367

Primary Examiner—Francis K. Zugel
Assistant Examiner—Peter R. Brown
Attorney, Agent, or Firm—Browdy and Neimark

[57] ABSTRACT

A double articulation for the angular adjustment of a seat back, particularly a motor vehicle seat back in which the iron fitting with a locking arrangement comprises a fixed flange rigidly connected to the armature of the frame of the seat comprising, at its upper portion, a flat widened region carrying an articulation axis on which is pivotally mounted a mobile flange rigidly connected to the armature of the seat back.

1 Claim, 4 Drawing Sheets

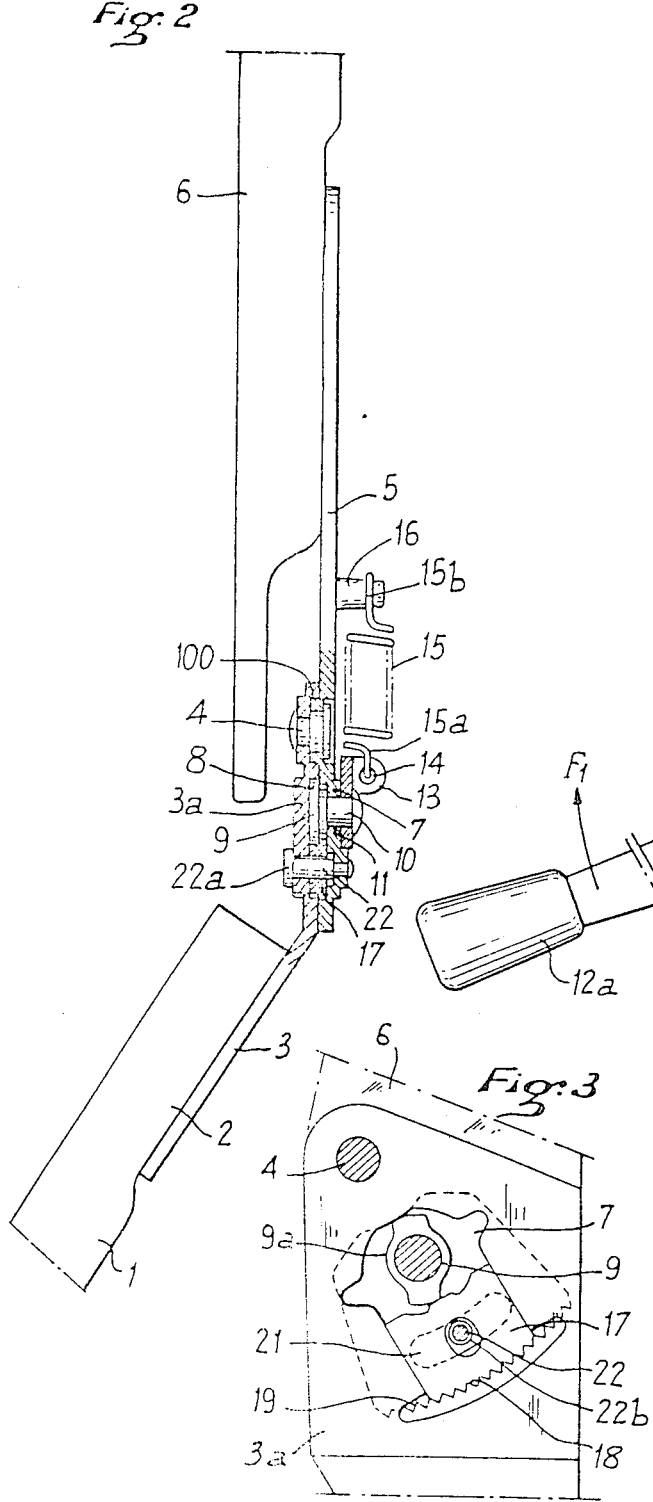
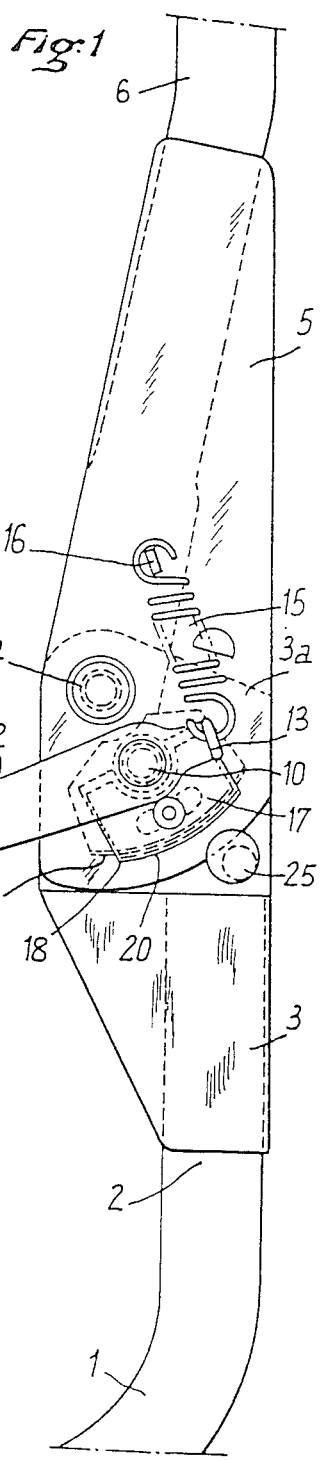
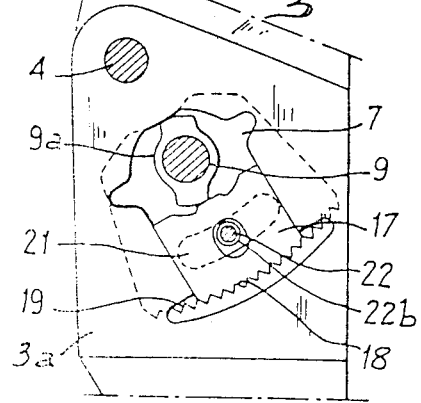

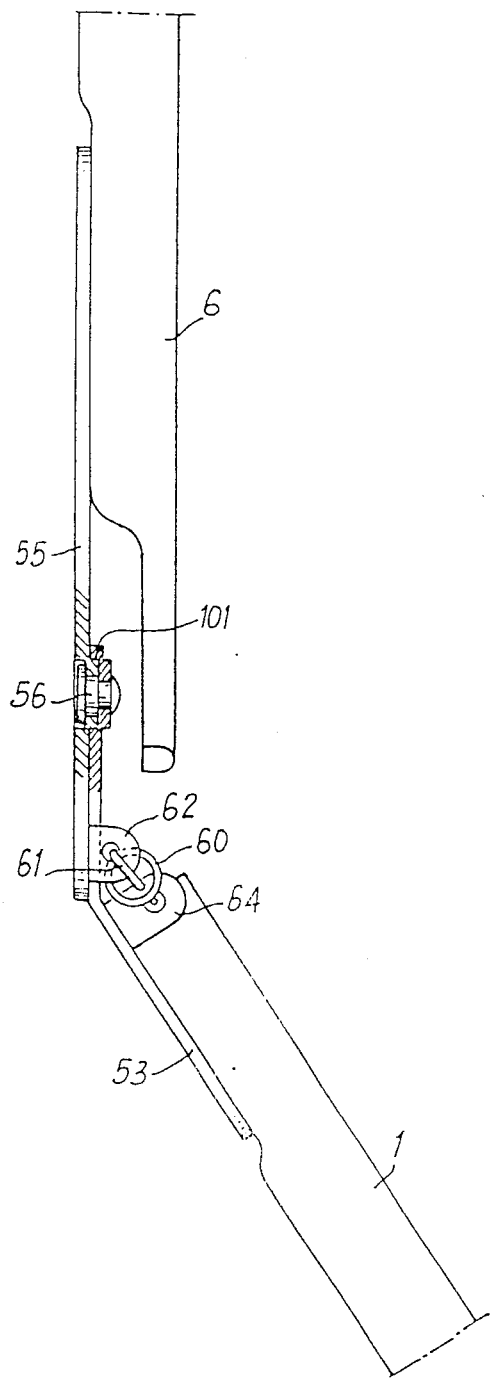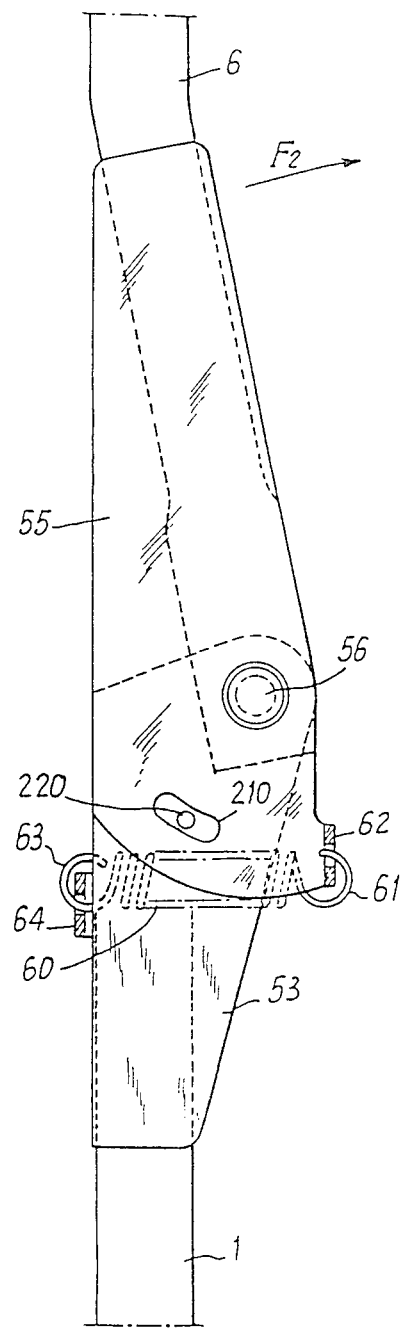

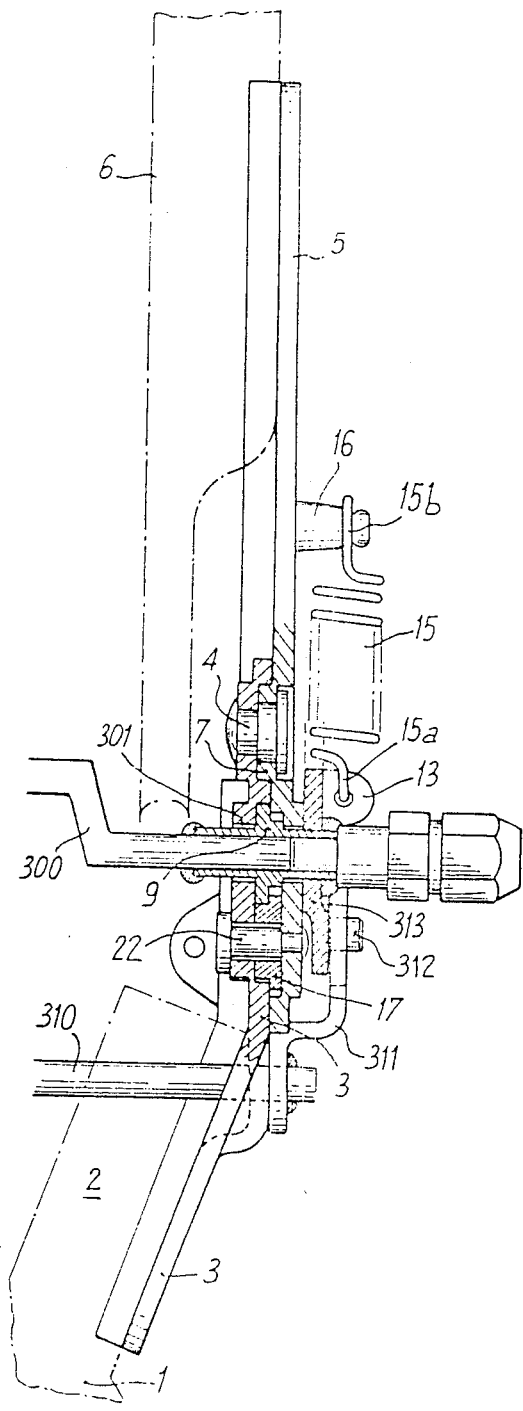
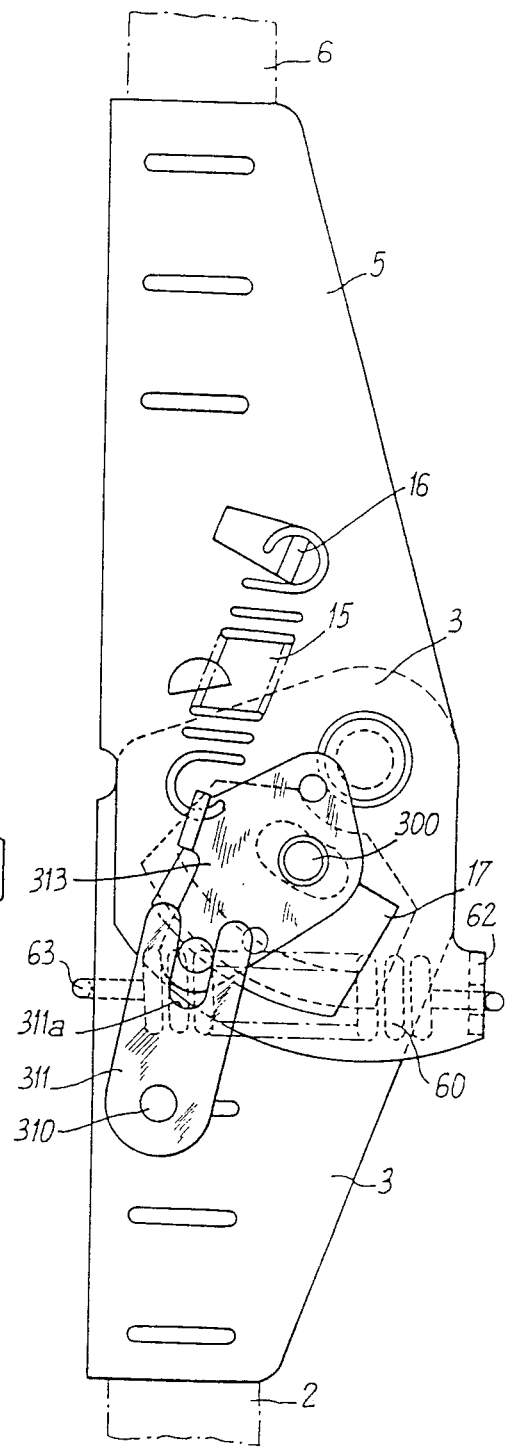

DOUBLE ARTICULATION MEANS FOR ANGULARLY ADJUSTING A SEAT BACK

This application is a continuation of application Ser. No. 606,992, filed 5/02/84, now abandoned, which is a continuation-in-part of application Ser. No. 278,594, filed June 29, 1981, now abandoned.

FIELD OF THE INVENTION

The object of the present invention is an articulation made of two elements enabling an angular adjustment of a seat back, particularly the seat back of land, aquatic or air vehicles.

INFORMATION DISCLOSURE STATEMENT

U.S. Pat. No. 4,076,309 to Chekirda shows an articulation comprising a single bearing plate mechanism working on a pin fixed to the flanges, the locking device being driven through rotation of an arm. The apparatus then works on shearing on a pin and causes a reaction on the articulation axis.

U.S. Pat. No. 4,087,885 to Gillentine shows an articulation in which a locking element works on shearing and on flexing in an aperture concentrical to a pivoting axis and in an aperture of a cam forming plate.

BACKGROUND OF THE INVENTION

The energy savings on the one hand and the safety standards on the other hand compell the manufacturers of seat articulations for land, aquatic or air vehicles to make assemblies which are more and more compact, light, but yet very resistant so as to provide a great security in all cases; this is the reason why the present invention provides two articulation iron fittings, one with manual control for the locking of the mobile portion on the fixed portion while the other is only a hinge for following the movement but without locking the mobile element with respect to the fixed element.

SUMMARY OF THE INVENTION

The invention more particularly relates to a double articulation means for angularly adjusting a seat back, particularly a motor vehicle seat back, in which an iron fitting with a locking arrangement comprises a fixed flange rigidly connected to the seat frame and comprising, at the upper portion thereof, a flat widened region carrying an articulation axis on which is pivotally mounted a mobile flange rigidly connected to the seat back, the flat widened region of the fixed flange has a recess with a lower curved toothed face, a mobile bearing plate having a lower curved toothed face and cooperating with the lower curved toothed face of the recess of said fixed flange, a rotating cam, a control shaft for controlling rotation of the rotating cam and being connected to a control lever, a return spring acting on the control lever, the return spring when returning to start position pushes back the mobile bearing plate on the recess of the fixed flange whereby the lower curved toothed face of the moblie bearing plate engages with the lower curved toothed face of the recess, and wherein the mobile flange rigidly connected to the seat back comprises a recess with said mobile bearing plate and said cam being positioned within said recess, said mobile bearing plate and said cam being further positioned within the recess of the flat widened region of said fixed flange in order to limit volume bulkness of the articulation while reinforcing resistance of the articulation and avoiding reaction on the articulation axis.

According to another feature of the invention, a resilient element is interposed between the mobile bearing plate and the bottom of the recess of the mobile flange in order to enable an easy lift-up of the mobile bearing plate and a disengagement of the fixed and mobile toothed faces upon escapement of the cam by rotation of the control shaft against biasing of the return spring.

According to still another feature of the invention, the mobile bearing plate moves along an arc of circle defining the foremost position and the rearmost position of the seat back.

According to a further feature of the invention, the mobile bearing plate is provided with an oblong window through which extends a pin rigidly connecting the lower portion of the fixed flange relative to the mobile flange, the flat widened region of the fixed flange having an arcuate opening in which moves said pin.

Various other features of the invention will become more apparent from the following detailed description.

BRIEF DESCRIPTION OF THE DRAWINGS

An embodiment of the invention is shown by way of example in the accompanying drawings wherein:

FIG. 1 is a diagrammatic side elevation view of an iron fitting comprising the locking arrangement;

FIG. 2 is a diagrammatic front elevation view, partly in cross section corresponding to FIG. 1;

FIG. 3 is an enlarged diagrammatic side elevation view, partly in cross-section, of a portion of the locking iron fitting of FIGS. 1 and 2;

FIGS. 4 and 5 are respectively side elevation and front elevation diagrammatic views, partly in cross section, of the iron fitting without locking means, positioned on the inner side of the seat back, namely near another seat of a vehicle;

FIG. 6 is a diagrammatic side elevation view of the iron fitting comprising the locking means without control lever, this figure showing two embodiments of indirect controls;

FIG. 7 is a diagrammatic front elevation view partly in cross section, corresponding to FIG. 6.

DESCRIPTION OF THE PREFERRED EMBODIMENT

Figure 3A:
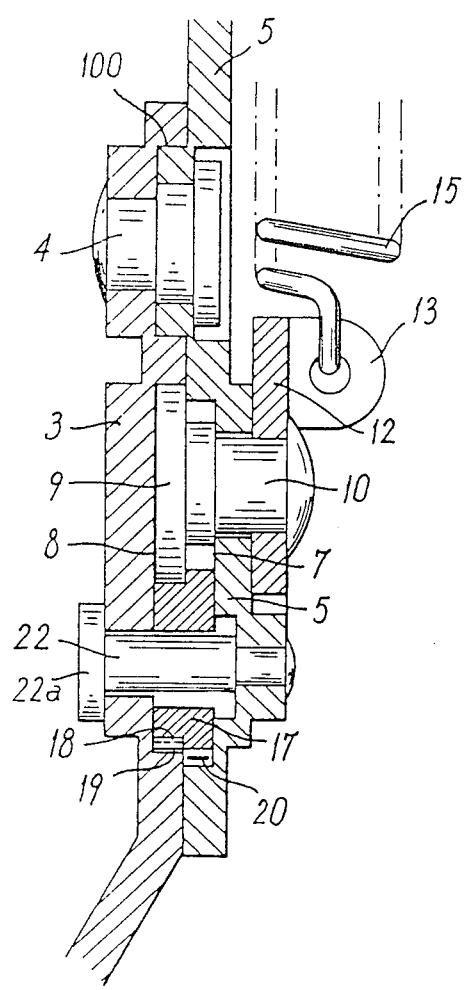
FIG. 3a is an enlarged diagrammatic partial front elevation view, partly in cross-section corresponding to FIG. 2.

In FIG. 1 there is partially shown an armature 1 of the frame of a seat which carries, at its upper portion 2, a fixed flange 3 whose upper portion 3a which is plane and vertical, is substantially in the shape of a trapezium, when seen from the front part. The upper portion of this trapezium supports an articulation pin 4. A cut-out portion 100 (FIGS. 2 and 3a) is provided for pivoting of a mobile flange 5 which is rigidly connected to the armature 6 of the seat back. The mobile flange 5 is plane and substantially of a rectangular shape. The mobile flange 5 comprises, in its central portion, a recess 7 corresponding to an opposite recess 8 of the fixed flange 3, and the chamber thus formed contains a cam 9 mounted on a shaft 10 seated in a bearing 11 formed with a hole extending through the mobile flange 5.

The shaft 10 carries a control lever 12 provided with a gripping handle 12a at one of its ends while its other end is folded at a right angle for forming a finger 13 comprising a hole 14 into which is engaged a hook-shaped end 15a of a spring 15 attached by its end 15b to a finger 16 which is rigidly connected to the lateral side of the mobile flange 5.

The chamber formed by the recesses 7, 8 also comprises a bearing plate 17 adapted for sliding vertically and comprising a toothing 18 meshing with the curved toothing 19 of the fixed flange 3. The curved toothing 19 is formed at the lower portion of the recess 8. As better shown in FIGS. 1, 2 and 3a, a resilient element in the form of a spring blade 20 is housed under the mobile bearing-plate 17 within the recess 7, between the bearing plate 17 and bottom of the recess 7 of the mobile flange 5.

The spring blade 20 enables to lift up slightly the bearing plate 17 so as to disengage the toothings 18 of the bearing-plate 17 from the toothing 19 of the recess 8 of the fixed flange 3 when a person who wishes to adjust the seat back operates, in direction of arrow $F_1$, the lever 12 against bearing action of the spring 15 forming a return spring. In the present case, the cam 9 (see FIG. 3), due to its shape applies strongly the toothing 18 of the bearing-plate 17 on the curved toothing 19 under action of the return spring 15 when it rotates, and the cam 9 does not push back the bearing plate 17 any more and the resilient element 20 lifts up this bearing plate 17 while disengaging thus the toothings 18 and 19.

As is apparent from the drawings, the vertically mobile bearing plate 17, which moves along an arc of a circle defining the foremost position and the rearmost position of the seat back is formed with an oblong window 22b; samely, the fixed flange 3 is formed with an arcuate opening 21 in which can extend a small pin 22 rigidly connected to the mobile flange 5. The pin 22 carries, on the side of the fixed flange 3, a head 22a. The pin 22 maintains the lateral position of the fixed and mobile flanges in the notched region of the bearing plate 17. This avoids a movement separating the flanges when they are subjected to efforts and thus maintains all the contact surfaces between the bearing plate 17 and the fixed and mobile parts.

In this respect, the pin 22 is of a diameter slightly smaller than width of the slot 22b in order to allow a small lift up of the bearing plate 17 under action of the above mentioned resilient element 20 in order to make possible a disengagement of the toothing 18 of the bearing plate 17 from the toothing 19 of the fixed flange 3. It should also be noted that the vertical movement of the bearing plate 17 is very small and generally smaller than half a millimeter and just enough to disengage the toothings 18, 19. The play or space (oblong window 22b) provided between the pin 22 and the bearing plate 17 makes possible the small vertical movement of the bearing plate 17.

Fixation and guiding of the mobile flange 5, relative to the fixed flange 3, are completed by a stud 25 of known type.

As can be appreciated from the foregoing disclosure, it is sufficient to unclamp the bearing plate 17 by means of the cam 9, whose profile 9a has a diameter less than the profile 9b, for enabling rotation of the seat back relative to the seat frame as said seat back has a tendency to tilt back on the back of the user (see FIGS. 4 and 5). Actually the mobile flange 55 of the unlocked iron fitting which is articulated on a pin 56 maintained by a shape 101 which is rigidly connected to the fixed flange 53 is returned, in the direction of arrow $F_2$ (see FIG. 4), by a spring 60 the end 61 of which is attached to the flange 55 through a lug 62 while the end 63 of the same spring 60 is attached to a lug 64 secured to the fixed flange 53. Likewise, a half-curved cut opening 210 provided in the mobile portion limits tilting of the seat back, this being obtained by the cut-out element 220 in the fixed portion 53. In some cases, there is provided instead of the simple articulation means of FIGS. 4 and 5 an articulation identical to that of FIGS. 1 and 2 but the control of the bearing plate of which is obtained by a connecting rod 300 directly soldered on the cam 9. There is therefore provided a passage 301 formed by a hole in the fixed flange 3.

In other cases also, the movement of the bearing plate 17 can be controlled by the cam 9 by means of a rod 310 fixed on a part 311 which by moving a dog 312 causes the rotation of a piece 313 rigidly connected to the cam 9. In this case, the part 311 is formed with an elongated opening 311a as shown in FIG. 6.

The invention is not limited to the embodiment shown and described in detail and various modifications can be carried out without departing from the scope of the invention as shown in the appendent claims.

We claim:

1. An articulation means for angularly adjusting a seat back, particularly a motor vehicle seat back, relative to a seat frame, comprising
    a fixed flange (3) rigidly connected to the seat frame and having, at an upper portion thereof, a flat widened region carrying a shaft (4) defining a first axis, the flat widened region of said fixed flange further having a first recess (8) with a lower curved toothed face,
    a mobile flange (5) pivotally mounted on said shaft (4) for pivoting about said first axis,
    a mobile bearing plate (17) supported in said first recess (8) for movement toward and away from said first axis and having a lower curved toothed face for selectively engaged with the lower curved toothed face of the recess of said fixed flange (3),
    a rotating cam (9) carried by said mobile flange (5) and defining a second axis (10) displaced from said first axis,
    a shaft extending along said second axis (10), for controlling rotation of the rotating cam (9) about said second axis (10) and being connected to a control lever (12),
    a return spring (15) acting on the control lever (12),
    said return spring (15) biasing said control lever (12) to a position in which said cam (9) urges the mobile bearing plate (17) in the first recess (8) of the fixed flange (3) in a direction radially away from said second axis (10) so that the lower curved toothed face of the mobile bearing plate (17) engages with the lower curved toothed face of the first recess (8),
    said mobile flange (5) rigidly connected to the seat back including a second recess (7) which cooperates with said first recess (8) of the fixed flange (3) to form a housing with said mobile bearing plate (17) and said cam (9) being positioned within said housing (7), in order to limit the volume bulkness of the articulation while reinforcing resistance of the articulation axis and avoiding reaction on said articulation axis and,
    a resilient element (20) interposed between the mobile bearing plate (17) and the bottom of the recess (7) of the mobile flange (5),
    wherein the mobile bearing plate (17) is provided with an oblong window into which extends a pin (22) rigidly connecting a lower portion of the fixed flange (3) relative to the mobile flange (5), the flat widened region of the fixed flange (3) having an arcuate opening in which moves said pin.

* * * * *